US012622493B2

(12) United States Patent (10) Patent No.: US 12,622,493 B2
Tao et al. (45) Date of Patent: May 12, 2026

(54) HEAD-MOUNTABLE DEVICE BAND WITH A LATCH MOVABLE BY A TAB

(71) Applicant: Apple Inc., Cupertino, CA (US)

(72) Inventors: Yiwei Tao, Campbell, CA (US); Aiden D. Mossop, San Francisco, CA (US); Benjamin A. Shaffer, San Jose, CA (US); Lauren D. Gerardi, Redwood City, CA (US); Nicolas Lylyk, Los Gatos, CA (US); Paul J. Thompson, Mountain View, CA (US); Richard P. Howarth, Lake Forest, IL (US); Robert V. Tang, San Francisco, CA (US); Toria F. Yan, San Jose, CA (US); Wei-Ling Chang, San Francisco, CA (US); Zebinah P. Masse, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 176 days.

(21) Appl. No.: 18/232,792

(22) Filed: Aug. 10, 2023

(65) Prior Publication Data

US 2024/0081489 A1 Mar. 14, 2024

Related U.S. Application Data

(60) Provisional application No. 63/405,327, filed on Sep. 9, 2022.

(51) Int. Cl.
*A44B 11/16* (2006.01)
*A44B 11/06* (2006.01)
*G02B 27/01* (2006.01)

(52) U.S. Cl.
CPC .............. *A44B 11/16* (2013.01); *A44B 11/06* (2013.01); *G02B 27/0176* (2013.01)

(58) Field of Classification Search
CPC ...... A44B 11/06; A44B 11/16; G02B 27/0176
(Continued)

(56) References Cited

U.S. PATENT DOCUMENTS 6,369,952 B1 * 4/2002 Rallison ............. G02B 27/0176
359/630
10,564,433 B2 * 2/2020 Lee ................... H01M 10/0436
(Continued)

FOREIGN PATENT DOCUMENTS

WO WO 2022/056380 3/2022

OTHER PUBLICATIONS

Invitation to Pay Additional Fees from PCT/US2023/031088, dated Dec. 19, 2023, 12 pages.
(Continued)

*Primary Examiner* — Peter N Helvey
(74) *Attorney, Agent, or Firm* — BAKERHOSTETLER

(57) ABSTRACT

A band includes a latch body that is movable by pulling a tab. The latch body extends through an opening of the band and secures with a pin located on a head-mountable device. The band can detach from the head-mountable device by pulling the tab, which actuates the latch body and removes the latch body from the pin. A spring (or springs) can bias the latch body toward the opening, causing the latch body to enter the pin. An applied force to the tab can overcome the biasing force provided by the spring(s), and move the latch body away from, and out of, the pin.

20 Claims, 6 Drawing Sheets

(58) Field of Classification Search
USPC ......................................................... 224/181
See application file for complete search history.

(56) References Cited

U.S. PATENT DOCUMENTS

| | | | | |
|---|---|---|---|---|
| 10,571,691 | B1 | 2/2020 | Yee et al. | |
| 10,578,875 | B1 * | 3/2020 | Bristol ............... | G02B 27/0176 |
| 10,656,670 | B2 * | 5/2020 | Hu ......................... | A45F 5/1516 |
| 10,845,604 | B2 * | 11/2020 | Morimoto ............ | G02B 27/017 |
| 11,048,093 | B2 * | 6/2021 | Chang .................. | G02B 27/017 |
| 11,892,647 | B2 * | 2/2024 | Hung ................. | G02B 27/0093 |
| 12,292,576 | B2 * | 5/2025 | Kasar ................. | G02B 27/0006 |
| 2002/0118506 | A1 * | 8/2002 | Saito ........................ | G06F 1/163 |
| | | | | 361/679.03 |
| 2016/0022018 | A1 | 1/2016 | Searle et al. | |

OTHER PUBLICATIONS

International Search Report and Written Opinion from PCT/US2023/031088, dated Feb. 9, 2024, 16 pages.

* cited by examiner

HEAD-MOUNTABLE DEVICE BAND WITH A LATCH MOVABLE BY A TAB

CROSS-REFERENCE TO RELATED APPLICATION(S)

The present application claims the benefit of U.S. Provisional Application No. 63/405,327, entitled "HEAD-MOUNTABLE DEVICE BAND WITH A LATCH MOVABLE BY A TAB," filed Sep. 9, 2022, the content of which is incorporated herein by reference in its entirety for all purposes.

FIELD

This application is directed to electronic devices, and more particularly, to bands used with head-mountable devices. The bands may include a latch that is actuated by a tab.

BACKGROUND

Devices, such as head-mountable devices, can secure with a band used to hold the device on a user's head. Some bands may be permanently secured to a head-mountable device. The size of the band can be subsequently adjusted using integrated features.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
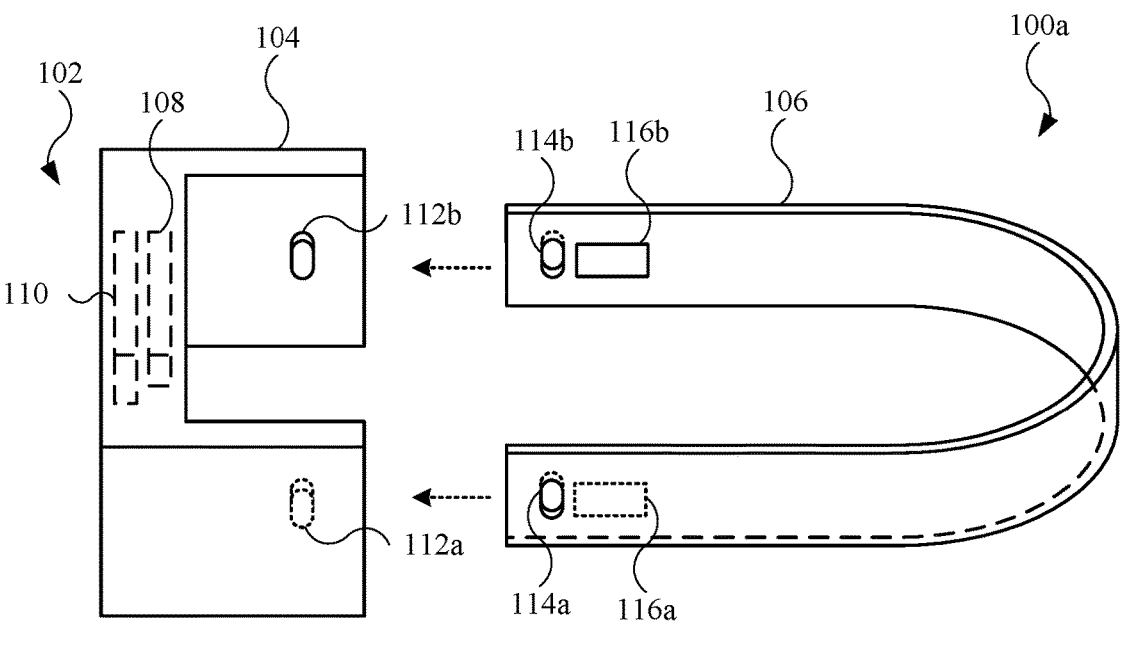
FIGS. 1 and 2 illustrate examples of a system with a head-mounted device, in accordance with aspects of the present disclosure.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

A head-mountable device (HMD), such as a head-mounted display, headset, visor, smartglasses, head-up display, etc., can perform a range of functions that is determined by the components (e.g., sensors, circuitry, and other hardware) included with the HMD as manufactured. For example, an HMD with virtual reality capabilities can replace a natural, real-life environment with virtual content. In another example, an HMD with augmented, or mixed, reality capabilities allow users to view certain computer-generated images superimposed onto a natural, real-life environment. In order to fit and maintain an HMD on a user's head, a band can attach to the HMD.

The subject technology is directed to modifications to a band that facilitate securing/coupling the band with the HMD as well as removal of the band from the HMD. Bands described herein may include an opening that receives a pin, or connector, from the HMD. In order to retain the pin in the opening and secure the band with the HMD, the band includes a latch body. The latch body can remain secured in the pin based upon one or more springs biasing the latch body within the pin. The band further includes a tab, or pull tab, designed to actuate the latch body out of the pin. For example, a user can grasp the tab and pull the tab. When the applied force by the user overcomes the biasing force provided by the spring(s), the latch body is removed from the pin, and the band can be separated from the HMD.

To facilitate movability of the latch body, the tab can be secured with a bar (or bars). At least one of the bars may act as a pulley such that when pulling the tab, the pulley assists in actuating the latch body. Further, using the pulley, the displacement of the tab and the latch body may differ. For example, the tab may travel 2 millimeters (mm) while the latch body travels 1 mm and is nonetheless removed from the pin of the HMD. The disparate displacement between the latch body and the tab may enhance the user experience of interacting with the band.

These and other embodiments are discussed below with reference to FIGS. 1-8. However, those skilled in the art will readily appreciate that the detailed description given herein with respect to these Figures is for explanatory purposes only and should not be construed as limiting.

According to some embodiments, for example as shown in FIG. 1, a system 100a can include a head-mountable device 102 that includes a frame 104 and a band 106 designed to couple/secure to the frame 104. The frame 104 can be positioned in front of the eyes of a user to provide information within a field of view of the user. The frame 104 can provide nose pads or another feature to rest on a user's nose. The frame 104 further includes one or more displays 108 (e.g., one for each eye). The head-mountable device 102 can include a camera 110 for capturing a view of an environment external to the head-mountable device 102. The one or more displays 108 can provide visual (e.g., image or video) output based on the view captured by the camera 110. For example, the one or more displays 108 can transmit light from the camera 110 based on a physical environment for viewing by the user. The one or more displays 108 can include components with optical properties, such as lenses for vision correction based on incoming light from the physical environment. Additionally or alternatively, the one or more displays 108 can provide information as a display within a field of view of the user. Displayed information can be provided to the exclusion of a view of a physical environment or in addition to (e.g., overlaid with) a physical environment.

The frame 104 and/or the band 106 can serve to surround a peripheral region of the head-mountable device 102 as well as support any internal components in their assembled position. For example, the frame 104 can enclose and support various internal components (including for example integrated circuit chips, processors, sensors, input/output devices, memory devices, and other circuitry) to provide computing and functional operations for the head-mountable device 102.

The head-mountable device 102 and the band 106 may include features and modifications to secure with and detach from each other. For example, the head-mountable device 102 includes a pin 112a and a pin 112b that can be inserted into an opening 114a and an opening 114b, respectively, of the band 106, thus allowing the band 106 to secure with the head-mountable device 102. In order to detach the band 106 from the head-mountable device 102, the band 106 includes a tab 116a and a tab 116b. A force (e.g., pulling force) applied to the tab 116a causes the pin 112a to release from the opening 114a, and similarly, a force applied to the tab 116b causes the pin 112b to release from the opening 114b. Accordingly, as a result of pulling the tabs 116a and 116b, the band 106 can detach from the head-mountable device 102. This will be shown and described in further detail below.

Figure 2:
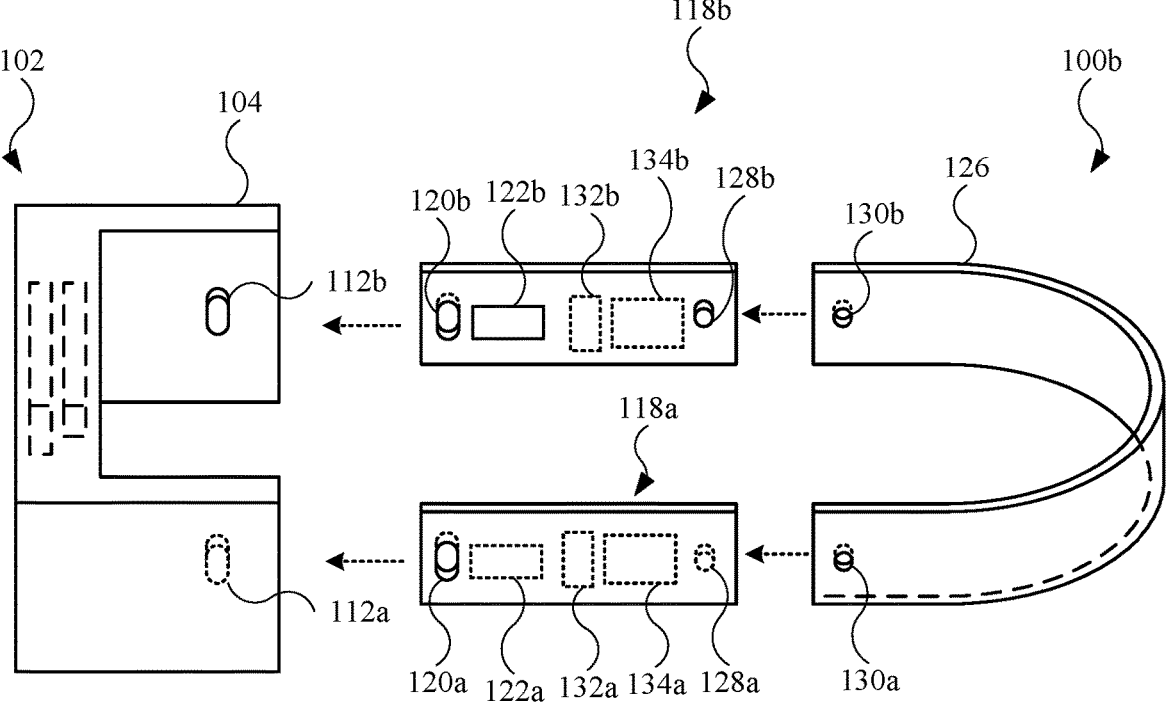

Referring to FIG. 2, a system 100b includes the head-mountable device 102 designed to secure with alternate components. For example, an intermediate band 118a and an intermediate band 118b can secure with the head-mountable device 102. As shown, the intermediate band 118a and the intermediate band 118b include an opening 120a and an opening 120b, respectively, with the opening 120a and an opening 120b securable with the pin 112a and the pin 112b, respectively, of the head-mountable device 102. Also, the intermediate band 118a and the intermediate band 118b include a tab 122a and a tab 122b, respectively. A force applied to the tab 122a and the tab 122b causes the pin 112a and the pin 112b, respectively, to release from the opening 120a and the opening 120b, respectively.

Additionally, the intermediate bands 118a and 118b can secure with a band 126 used to wrap around a user's head. As shown, the intermediate band 118a and the intermediate band 118b include a pin 128a and a 128b, respectively. The band 126 includes an opening 130a that can receive the pin 128a of the intermediate band 118a, as well as an opening 130b that can receive the pin 128b of the intermediate band 118b.

The intermediate bands 118a and 118b can provide several features. For example, the intermediate band 118a and the intermediate band 118b may include an audio assembly 132a and an audio assembly 132b, respectively. The audio assemblies 132a and 132b may each include a speaker module designed to generate soundwaves (e.g., acoustical energy) based on one or more signals and commands from the head-mountable device 102. Additionally, or alternatively, the audio assemblies 132a and 132b may each include a microphone designed to convert received audio signals (e.g., from a user or the environment) to electrical signals that are provided to the head-mountable device 102. Also, the intermediate band 118a and the intermediate band 118b may each include a power supply 134a and a power supply 134b, respectively. The power supplies 134a and 134b may provide power to the audio assemblies 132a and 132b, respectively. Additionally, the power supplies 134a and 134b may provide an alternate power source for the head-mountable device 102.

Figure 3:
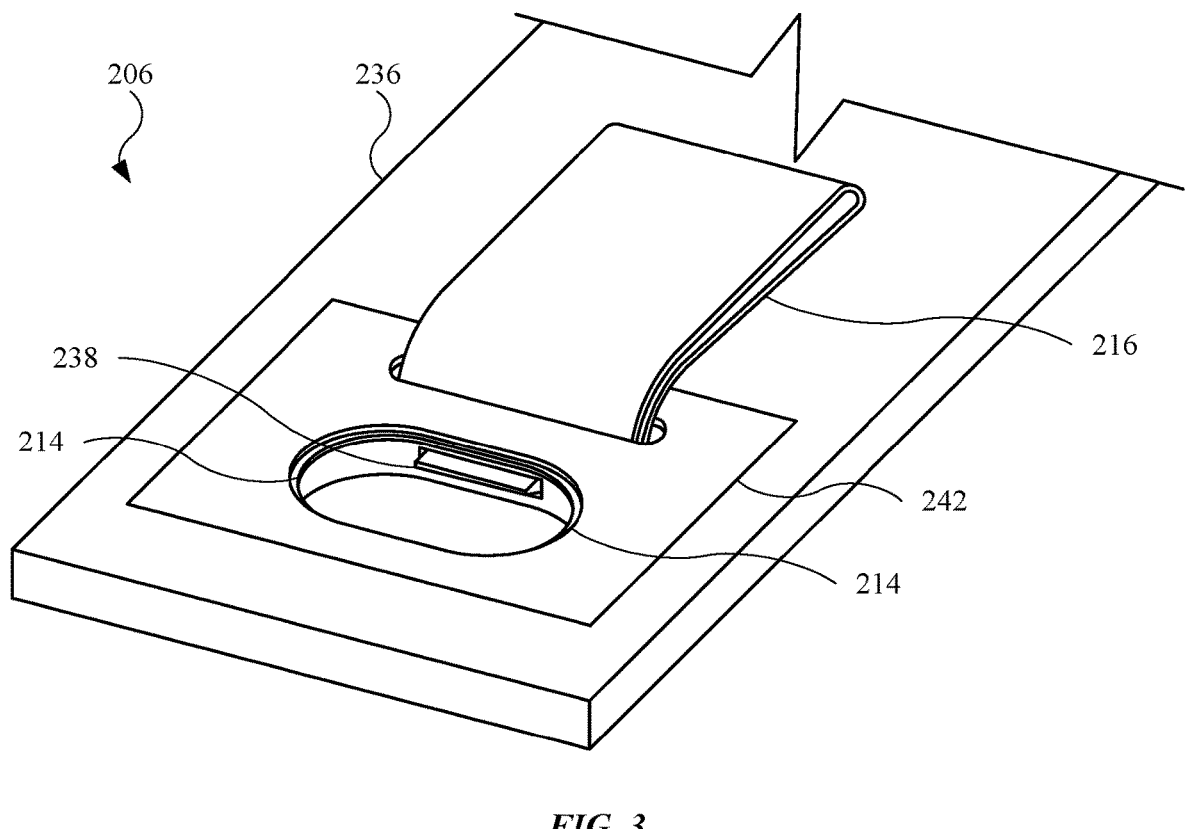
FIG. 3 illustrates a perspective view of a band with connection features used to connect a head-mounted device to a strap or an intermediate device, in accordance with aspects of the present disclosure.

Referring to FIG. 3, a band 206 is designed to secure with head-mountable devices. The band 206 may take the form of a band 106 (FIG. 1) or one of the intermediate band 118a, the intermediate band 118b, and the band 126 (shown in FIG. 2). As shown, the band 206 includes a strap 236 that acts as a body or band body used to carry several components. For example, the band 206 includes an opening 214 formed in the strap 236. The opening 214 represents a through hole in the strap 236 and is used to receive a pin (not shown in FIG. 3), or connector, of a head-mountable device. As shown, the opening 214 includes a lozenge shape or a pill shape. However, other shapes are possible. For example, the opening 214 can generally take a shape that corresponds to a shape of a pin such that the opening 214 can receive the pin.

Also, the band 206 includes a latch body 238 stored in the strap 236. As shown, the latch body 238 at least partially extends into the opening 214. In order to actuate and the latch body 238 out, or at least partially out, of the opening 214, the band 206 includes a tab 216. The tab 216 may include multiple structures (e.g., yarns, polymer strands) woven together, as a non-limiting example. The tab 216 can be displaced, or pulled, and the displacement of the tab 216 causes actuation of the latch body 238 at least partially out of the opening 214. When the force that displaces the tab 216 is removed, the tab 216 returns to its original position and the latch body 238 returns to its position within the opening 214.

The band 206 further includes a ring 240 that extends along the opening 214. Moreover, the ring 240 extends into the opening 214. In this manner, when a pin is inserted into the opening 214, the ring 240 engages the pin. Beneficially, the ring 240 effectively closes or plugs a gap between the strap 236 and the pin at the opening 214, thus limiting or preventing objects, such as a user's hair, from entering the opening 214. Also, the band 206 further includes a cap 242 that covers several components stored in the strap 236.

Figure 4:
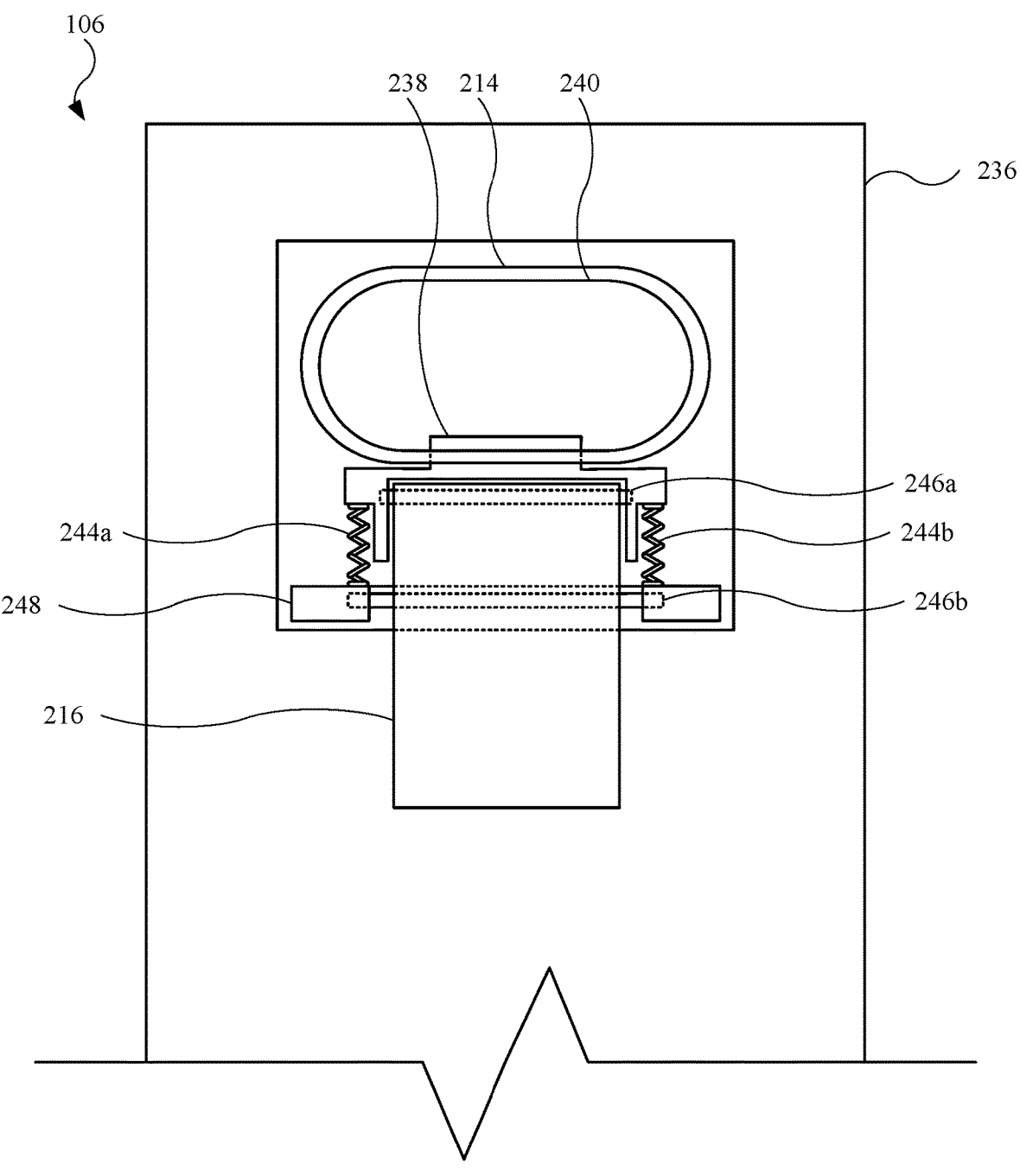
FIG. 4 illustrates a plan view of a band, showing additional connection features, in accordance with aspects of the present disclosure.

Referring to FIG. 4, the ring 240 follows the general shape of the opening 214. The cap 242 (shown in FIG. 3) is removed to show additional features. For example, the band 206 includes a spring 244a and a spring 244b carried within the strap 236. The springs 244a and 244b are connected to the latch body 238, and each act as a biasing element that biases the latch body 238 toward the opening 214 such that a portion of the latch body 238 extends through the opening 214. Also, as shown in FIG. 4, the tab 216 is between the springs 244a and 244b.

The band 206 further includes a bar 246a and a bar 246b. The bar 246a is engaged with and at least partially extends through the latch body 238. During user interaction with the tab 216, the bar 246a may act as a pulley. In this manner, the bar 246a facilitates actuation of the latch body 238 based on an applied force (e.g. pulling force) to the tab 216. This will be shown below. Also, the tab 216 secures with the strap 236 by wrapping around and engaging the bar 246b. The band 206 may include a stationary frame 248, or other stationary object, located in the strap 236 that holds the bar 246b in a stationary/fixed manner.

Figure 5:
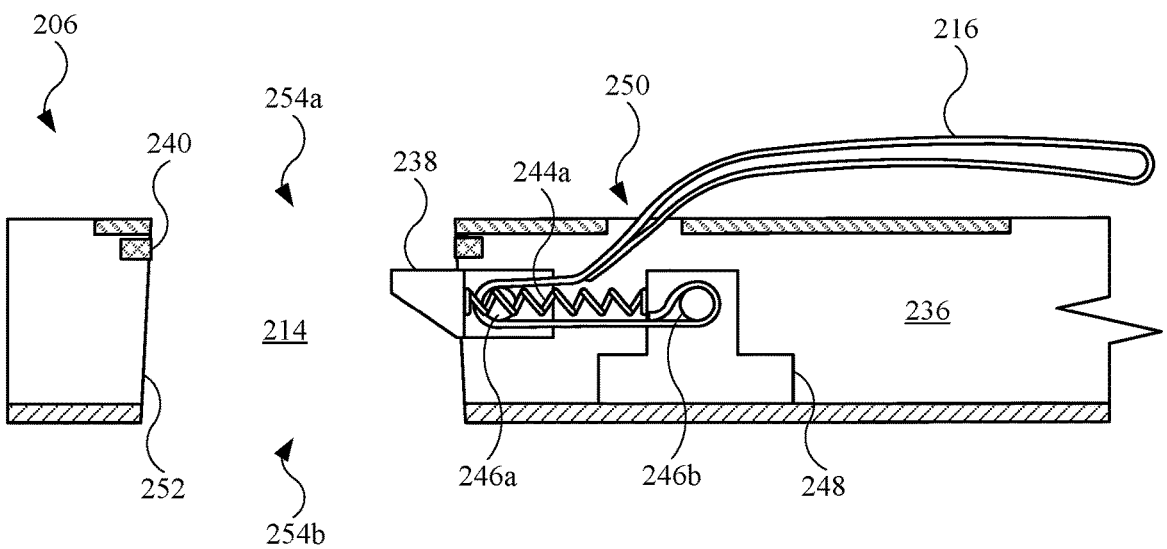
FIG. 5 illustrates a partial cross-sectional view of a band, showing a latch body extending into an opening, in accordance with aspects of the present disclosure.

Referring to FIG. 5, the spring 244a (and spring 244b, shown in FIG. 4) provides a biasing force, or spring force, that maintains the latch body 238 within the opening 214. The tab 216 wraps around the bar 246a and terminates at, and is connected to, the bar 246*b* that is held in place by the stationary frame 248. Also, the tab 216 extends through an opening 250 formed in the strap 236. Accordingly, the tab 216 is partially within the strap 236 and partially outside the strap 236.

The opening 214 may include a tapered surface 252. In this manner, the opening 214 may include a tapered opening with a surface opening 254*a* and a surface opening 254*b*, with the surface opening 254*a* having a diameter that is smaller than that of the surface opening 254*b*. Put another way, the diameter of the surface opening 254*b* is larger than that of the surface opening 254*a*. Also, the ring 240 is located between the surface opening 254*a* and the latch body 238. However, other locations are possible, such as between the surface opening 254*b* and the latch body 238.

Figure 6:
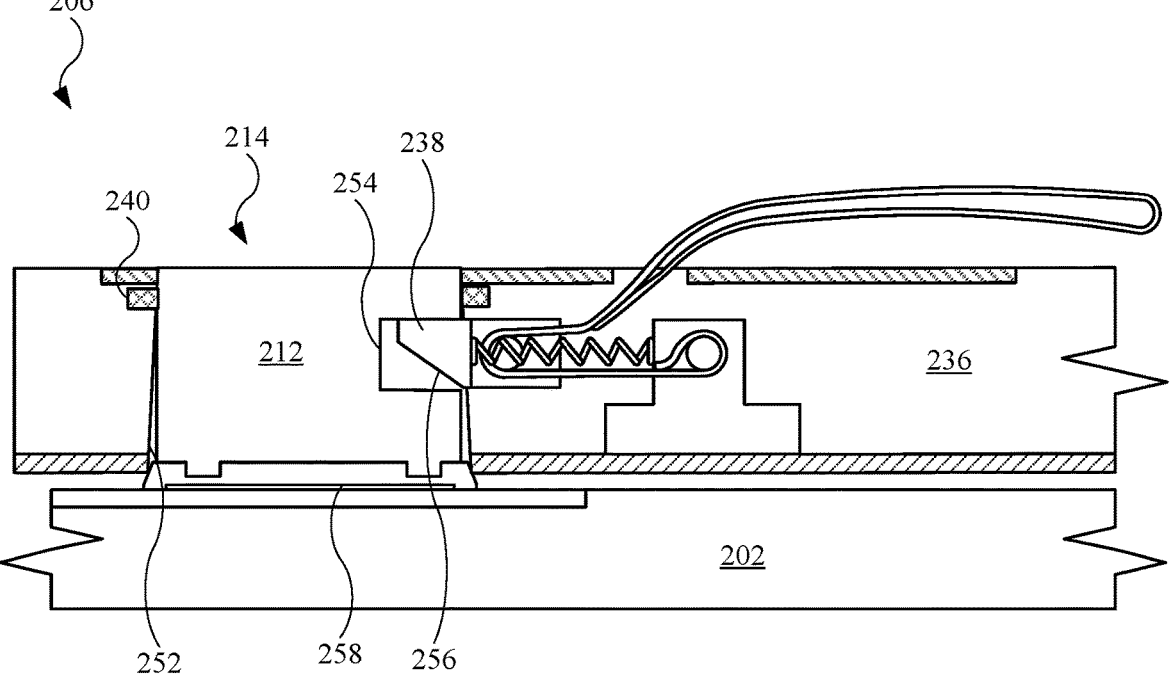
FIG. 6 illustrates a partial cross-sectional view of a band, showing a pin engaged with a latch body, in accordance with aspects of the present disclosure.

Referring to FIG. 6, a head-mountable device 202 is connected to the band 206. As shown, the head-mountable device 202 includes a pin 212 located in the opening 214. As shown, the pin 212 includes a cavity 254 that receives the latch body 238. When the latch body 238 is located in the cavity 254, the pin 212 is secured within the opening 214, and the head-mountable device 202 and the band 206 are secured together. To facilitate the process, the latch body 238 may include a chamfered surface 256 used as an initial engagement surface between the pin 212 and the latch body 238. As shown, the chamfered surface 256 is facing, or directed toward, a surface opening (e.g., surface opening 254*b* in FIG. 5) of the strap 236 that initially receives the pin 212. Further, when inserted into the opening 214, the pin 212 engages the ring 240, thus closing a gap between the pin 212 and the strap 236.

While it may be desirable for the pin 212 to remain in the opening 214, it is generally undesirable for the pin 212 to become lodged or stuck in the opening 214. Beneficially, the tapered surface 252 of the opening 214 not only provides additional space/volume for the pin 212 to enter the opening 214, but also prevents binding, or unwanted lodging, between the pin 212 and the strap 236 at the opening 214.

In order to mitigate wobbling, or unwanted movement, between the head-mountable device 202 and the band 206, the head-mountable device 202 may include a ring 258 connected to the pin 212. The ring 258 is designed to at least partially enter a gap between the pin 212 and the strap 236, as shown in FIG. 6. The ring 258 may include a compressive material (e.g., rubber) or materials. In this manner, the ring 258 may compress and conform to the shape of the gap, thus mitigating or preventing wobbling of the head-mountable device 202 and/or the band 206. Thus, the ring 258 mitigates the additional volume due to the tapered surface 252 and or various tolerance issues related to the pin 212 and/or the opening 214. In some embodiments (not shown in FIG. 6), the pin 212 includes a tapered surface and the opening 214 does not include a tapered surface.

FIG. 5 and FIG. 6 illustrate a latch position in which latch body 238 can enter the pin 212, thus securing the band 206 with the head-mountable device 202.

Figure 7:
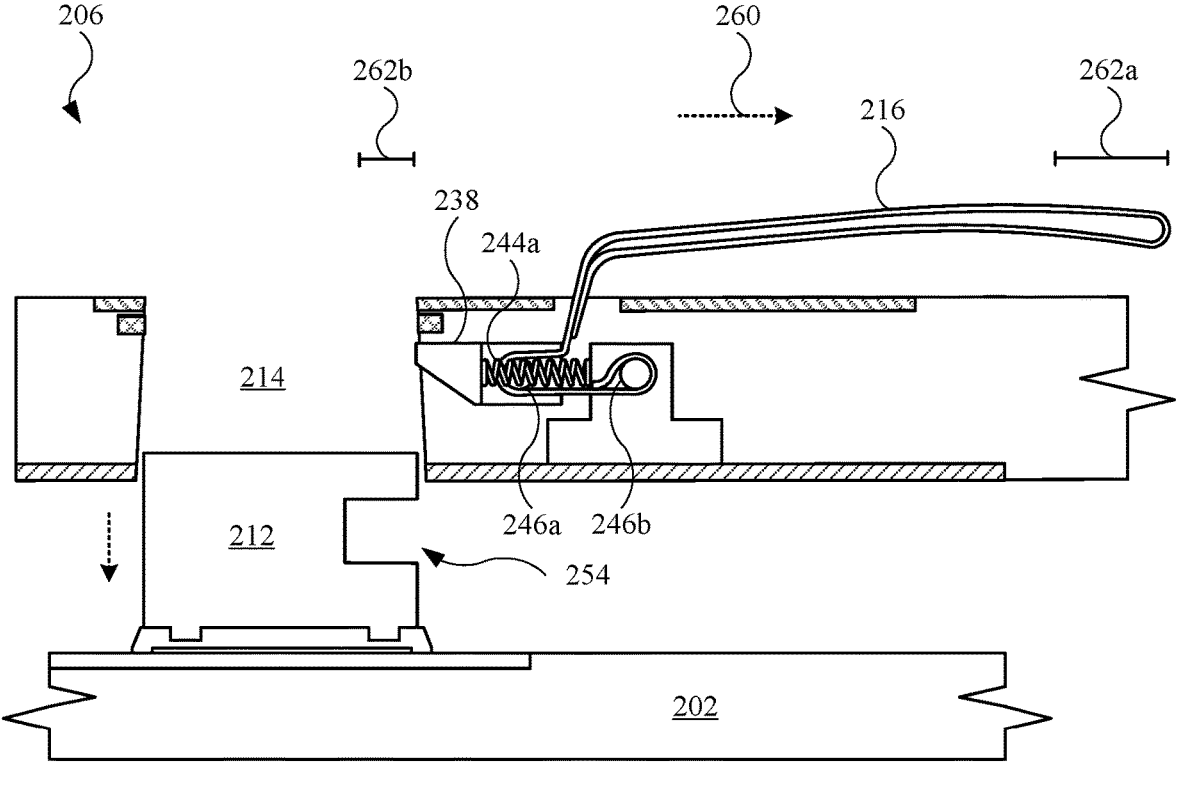
FIG. 7 illustrates a partial cross-sectional view of a band, showing a latch body actuated by a tab, in accordance with aspects of the present disclosure.

Referring to FIG. 7, an applied force to the tab 216 in the direction of the arrow 260 displaces the tab 216, while also displacing the latch body 238. As a result, the latch body 238 is removed from the cavity 254 of the pin 212, and the pin 212 is ejected from the opening 214. The force applied to the tab 216 overcomes a biasing force provided by the spring 244*a* (and the spring 244*b*, shown in FIG. 4). As shown, the latch body 238 is actuated and removed, or at least partially removed, from the opening 214. Accordingly, FIG. 7 illustrates a latch position in which the band 206 can be detached from the head-mountable device 202.

Due in part to the tab 216 being wrapped around the bar 246*a* and the bar 246*a* being connected to the latch body 238, the applied force to the tab 216 that actuates the latch body 238 also actuates the bar 246*a*, causing the bar 246*a* to move relative to, and toward, the bar 246*b*. Also, based on the tab 216 being wrapped around the bar 246*a*, the displacement of the tab 216 may be different than that of the latch body 238. For example, when the tab 216 is displaced by a distance 262*a*, the latch body 238 is displaced by a distance 262*b*, which is different from the distance 262*a*. As shown, the distance 262*b* is less than the distance 262*a*. In some embodiments, the distance 262*b* is half, or approximately half, of the distance 262*a*. It should be noted that when the applied force to tab 216 is released, the latch body 238 is actuated by the springs 244*a* and 244*b* such that the latch body 238 moves toward, and is located in, the opening 214.

Figure 8:
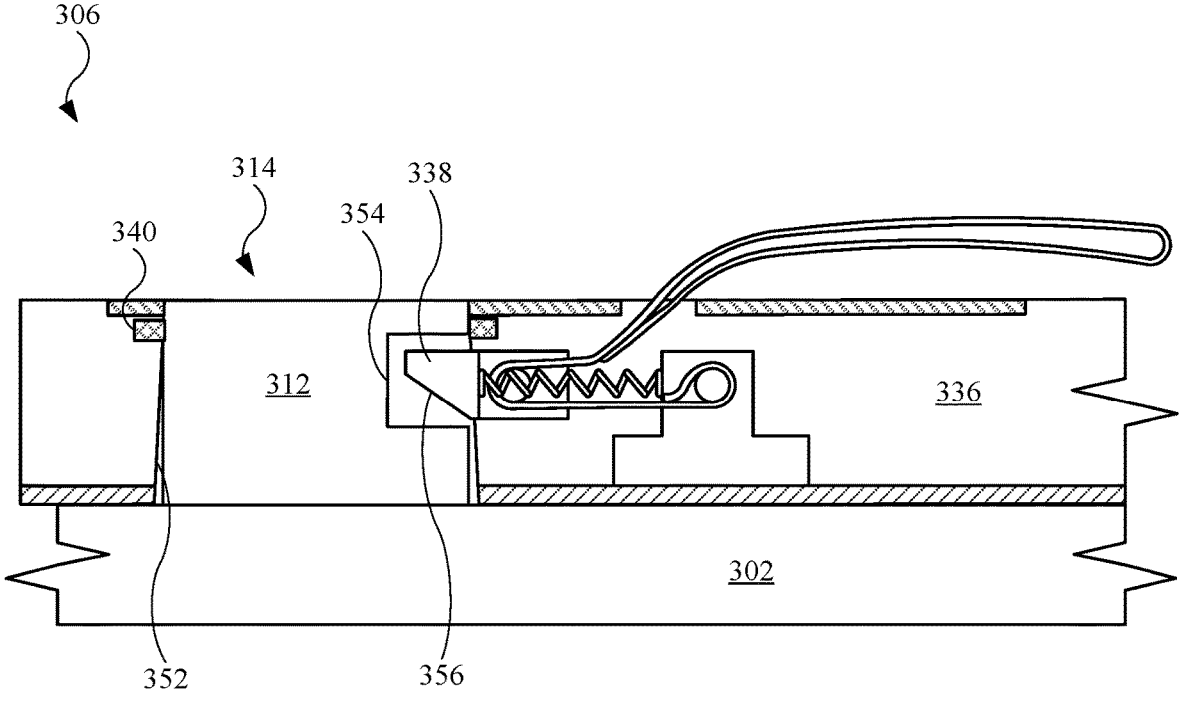
FIG. 8 illustrates a partial cross-sectional view of an additional example of a band, showing a pin connected to a head-mountable device without a ring between the pin and the head-mountable device, in accordance with aspects of the present disclosure.

Referring to FIG. 8, a head-mountable device 302 is connected to the band 306. As shown, the head-mountable device 302 includes a pin 312 located in the opening 314. As shown, the pin 312 includes a cavity 354 that receives the latch body 338. When the latch body 338 is located in the cavity 354, the pin 312 is secured within the opening 314, and the head-mountable device 302 and the band 306 are secured together. To facilitate the process, the latch body 338 may include a chamfered surface 356 used as an initial engagement surface between the pin 312 and the latch body 338. As shown, the chamfered surface 356 is facing, or directed toward, a surface opening of the strap 336 that initially receives the pin 312. Further, when inserted into the opening 314, the pin 312 engages the ring 340, thus closing a gap between the pin 312 and the strap 336. The opening 314 may include a tapered surface 352 to provides additional space/volume for the pin 312 to enter the opening 314 and to binding, or unwanted lodging, between the pin 312 and the strap 336 at the opening 314. Also, while prior examples of a head-mountable device may include a ring (e.g., head-mountable device 202 with a ring 258 shown in FIG. 6), the head-mountable device 302 does not include a ring.

FIGS. 3-8 show and describe connection features for one end of a band. However, it should be noted that the band shown in FIGS. 3-8 includes an additional, opposing end that may include any connection features for the ends shown and described in FIGS. 3-8.

Various examples of aspects of the disclosure are described below as clauses for convenience. These are provided as examples, and do not limit the subject technology.

Clause A: A band for a head-mounted device, the band including: a strap that defines a first opening and a second opening; a latch body movable with respect to the first opening; a spring coupled with the latch body; and a tab extending from the second opening, wherein: a first latch position includes the latch body positioned in the first opening based on the spring, and a second latch position includes the latch body pulled away from the first opening by the tab.

Clause B: A band for a head-mounted device, the band including: a strap that defines an opening; a latch body located in the opening; a bar extending through the latch body; and a tab that wraps around the bar, wherein displacement of the tab by a first distance causes actuation of the latch body by a second distance that is different from the first distance.

Clause C: A head-mountable device, including: a frame that carries a display; a pin extending from the frame, the pin including a cavity; and a band coupled with the frame, the band including: a strap that defines an opening; a latch body configured to enter the cavity; a pulley; and a tab that wraps around the pulley, wherein in response to an applied force to the tab, the pulley facilitates movement of the latch body out of the cavity.

One or more of the above clauses can include one or more of the features described below. It is noted that any of the following clauses may be combined in any combination with each other, and placed into a respective independent clause, e.g., clause A, B, or C.

Clause 1: further including a bar, wherein the tab wraps around the bar.

Clause 2: wherein the bar extends through the latch body.

Clause 3: further including a second bar, wherein: the bar defines a first bar, the tab wraps around the first bar and is secured with the strap at the second bar.

Clause 4: wherein the spring biases the latch body toward the first opening.

Clause 5: wherein: the spring is a first spring, and the tab is positioned between the first spring and the second spring.

Clause 6: wherein the first opening includes a tapered opening.

Clause 7: wherein the second latch position includes the tab applying a force that overcomes a biasing force of the spring.

Clause 8: wherein the second distance is less than the first distance.

Clause 9: further including a spring that biases the latch body toward the opening, wherein the displacement of the tab causes the actuation of the latch body away from the opening.

Clause 10: further including a second bar, wherein: the bar defines a first bar, the displacement by the tab causes the first bar to move relative to the second bar.

Clause 11: wherein the displacement by the tab causes the first bar to move toward the second bar.

Clause 12: wherein the tab is partially within the strap and partially outside of the strap.

Clause 13: wherein: the opening includes a first surface opening and a second surface opening larger than the first surface opening, and the opening defines a tapered surface based on the first surface opening and the second surface opening.

Clause 14: further including a ring located between the first surface opening and the latch body.

Clause 15: wherein: the band comprises a spring that provides a biasing force to the latch body, and in response to the applied force overcoming the biasing force, the latch body moves out of the cavity.

Clause 16: wherein the band further includes a ring that extends into the opening and engages the pin.

Clause 17: wherein the opening includes a lozenge shape.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other embodiments. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A band for a head-mountable device, the band comprising:
  a strap that defines a first opening and a second opening;
  a latch body movable with respect to the first opening;
  a spring coupled with the latch body; and
  a tab extending from the second opening, wherein:
    a first latch position comprises the latch body positioned in the first opening based on the spring, and
    a second latch position comprises the latch body pulled away from the first opening by the tab.

2. The band of claim 1, further comprising a bar, wherein the tab wraps around the bar.

3. The band of claim 2, wherein the bar extends through the latch body.

4. The band of claim 2, further comprising a second bar, wherein:
  the bar defines a first bar,
  the tab wraps around the first bar and is secured with the strap at the second bar.

5. The band of claim 1, wherein the spring biases the latch body toward the first opening.

6. The band of claim 1, further comprising a second spring, wherein:
  the spring is first spring, and
  the tab is positioned between the first spring and the second spring.

7. The band of claim 1, wherein the first opening comprises a tapered opening.

8. The band of claim 1, wherein the second latch position comprises the tab applying a force that overcomes a biasing force of the spring.

9. A band for a head-mountable device, the band comprising:
  a strap that defines an opening;
  a latch body located in the opening;
  a bar extending through the latch body;
  a tab that wraps around the bar, wherein displacement of the tab by a first distance causes actuation of the latch body by a second distance that is different from the first distance, wherein:
    the opening comprises a first surface opening and a second surface opening larger than the first surface opening, and the opening defines a tapered surface based on the first surface opening and the second surface opening; and
  a ring located between the first surface opening and the latch body.

10. The band of claim 9, wherein the second distance is less than the first distance.

11. The band of claim 9, further comprising a spring that biases the latch body toward the opening, wherein the displacement of the tab causes the actuation of the latch body away from the opening.

12. The band of claim 9, further comprising a second bar, wherein:
  the bar defines a first bar,
  the displacement by the tab causes the first bar to move relative to the second bar.

13. The band of claim 12, wherein the displacement by the tab causes the first bar to move toward the second bar.

14. The band of claim 9, wherein the tab is partially within the strap and partially outside of the strap.

15. A head-mountable device, comprising:
  a frame that carries a display;
  a pin extending from the frame, the pin comprising a cavity; and
  a band coupled with the frame, the band comprising:
    a strap that defines an opening;
    a latch body configured to enter the cavity;
    a pulley;
    a tab that wraps around the pulley, wherein in response to an applied force to the tab, the pulley facilitates movement of the latch body out of the cavity; and
    a ring that extends into the opening and engages the pin.

16. The head-mountable device of claim 15, wherein:
  the band comprises a spring that provides a biasing force to the latch body, and
  in response to the applied force overcoming the biasing force, the latch body moves out of the cavity.

17. The head-mountable device of claim 15, wherein the opening comprises a lozenge shape.

18. The head-mountable device of claim 15, wherein the tab is configured to be pulled to actuate the latch body.

19. The band of claim 1, wherein the tab comprises woven strands.

20. The band of claim 1, wherein the tab is configured to be pulled to actuate the latch body.

* * * * *